United States Patent
Huang et al.

(10) Patent No.: US 7,755,640 B2
(45) Date of Patent: Jul. 13, 2010

(54) GAMMA IMAGE CORRECTION METHOD AND DEVICE

(75) Inventors: Ming-Sung Huang, Chu Pei (TW); Chi-Chang Lu, Hsinchu (TW); Pei-Ting Tsai, Tai Tung (TW)

(73) Assignee: Etron Technology, Inc., Hsin Chu (TW)

( * ) Notice: Subject to any disclaimer, the term of this patent is extended or adjusted under 35 U.S.C. 154(b) by 397 days.

(21) Appl. No.: 11/896,880

(22) Filed: Sep. 6, 2007

(65) Prior Publication Data

US 2008/0075365 A1  Mar. 27, 2008

(30) Foreign Application Priority Data

Sep. 21, 2006  (TW) ............................... 95134896 A

(51) Int. Cl.
*G09G 5/00* (2006.01)
*G09G 5/02* (2006.01)
*H04N 9/73* (2006.01)
*H04N 1/46* (2006.01)
*G03F 3/08* (2006.01)
*G06K 9/00* (2006.01)
*G06K 9/32* (2006.01)

(52) U.S. Cl. ........................ 345/600; 345/428; 345/586; 345/590; 345/606; 348/657; 348/674; 358/519; 358/523; 358/525; 382/167; 382/274; 382/300; 382/305

(58) Field of Classification Search ................ 345/426, 345/428, 581, 586, 589–590, 600–601, 606, 345/549, 554, 618; 348/655–657, 674, 687; 358/515–519, 523–525; 382/162, 167, 254, 382/274, 276, 300–305
See application file for complete search history.

(56) References Cited

U.S. PATENT DOCUMENTS

| | | | | |
|---|---|---|---|---|
| 5,867,601 A | * | 2/1999 | Phillips | 382/250 |
| 5,903,470 A | * | 5/1999 | Miyoshi et al. | 716/2 |
| 2003/0038973 A1 | * | 2/2003 | Lee | 358/3.01 |
| 2003/0085894 A1 | * | 5/2003 | Tatsumi | 345/426 |
| 2005/0083344 A1 | * | 4/2005 | Higgins | 345/600 |
| 2006/0120598 A1 | * | 6/2006 | Takahashi et al. | 382/167 |

* cited by examiner

*Primary Examiner*—Wesner Sajous
(74) *Attorney, Agent, or Firm*—Muncy, Geissler, Olds & Lowe, PLLC

(57) ABSTRACT

The invention discloses a gamma image correction method and device that employs an improved interpolating operation, comprising receiving an original image data point; retrieving p conversion values (p is larger than 2) from a memory unit according to the original image data point; and arithmetically processing the p conversion values for generating a gamma corrected image parameter value from the original image data point wherein the original image data point is a N bits data, the memory unit contains $2^k$ conversion values and N is lager than k.

7 Claims, 11 Drawing Sheets

GAMMA IMAGE CORRECTION METHOD AND DEVICE

BACKGROUND OF THE INVENTION (a) Field of the Invention

The invention relates to an image processing method, and particularly to a gamma image correction method.

(b) Description of the Related Art

In general, image output or image input processing must provide a picture with smooth brightness variation for human eyes to see. As shown in FIG. 1, when an original image data with the brightness variation from very dark to very bright is transmitted to a display device without any correction process via image receiving or image capturing system, due to the influence of the response curve (as illustrated by the curve on the left hand side in FIG. 1) of the display device and other electronic devices, the original image data experience non-linear variations that cause human eyes to see intense contrast and feel very uncomfortable.

Generally, the method used to solve such problem is the gamma correction method to perform correcting processing. At first, a gamma correction curve (such as the middle curve in FIG. 1), corresponding to the original image curve, is provided in a graphic processor (not shown in the figure). Then the original image is sent to the graphic processor for mapping processing accompanying with the gamma correction curve so that the display device generates an almost linear smooth curve (such as the curve on the right hand side in FIG. 1). Therefore, the image seen by human eyes appears to be an image shown by a smooth curve. The image has smoother brightness variation and better contrast effect.

FIG. 2A illustrates a graphic processor 20 generally for carrying out a gamma correction process. If the data of each point of the original image data is represented by N bits, then the graphic processor 20 contains a memory unit that stores $2^N$ reference nodes. The combination of the $2^N$ reference nodes is generally called "Look Up Table (LUT)". Look up table is the table that contains the corresponding original image numbers and grey scales. The graphic processor 20 receives an N-bit original image data point Or and performs the corresponding operation on the original image data Or according to the look up table to generate an almost linear N-bit corrected image data T. The memory unit storing the $2^N$ reference nodes can be static random access memory (SRAM) or read-only memory (ROM). FIG. 2B shows an example of a general graphic processor 20. As the input original image data point Or is represented by N=10 bits, then the graphic processor 20 uses a memory unit M (i.e. $2^{10}$) and a multiplexer MUX to provide one corresponding conversion value for each of the original image data point Or to perform conversion and thereby obtain the corrected image parameter value. Therefore, the graphic processor 20 consumes 1024 units of the memory space. Although the corrected image becomes very fine, the cost of the whole graphic processing device is higher as the input image data is represented by more bits.

In order to overcome the problems of large required memory space and increased cost, FIG. 3A illustrates another graphic processor 30 in the prior art used for image correction. Only a little memory space is provided in graphic processor 30 for storing the image conversion value. For example, when the input original image data point Or is still represented by N=10 bits, although the original image data point can have 1024 possible values, the graphic processor 30 does not have 1024 units of the memory space like that described in FIG. 2B. It only uses a memory unit M' (for example, it has less than 1024 units of the memory space and has 64 units of the memory space.) together with two multiplexers MUX1 and MUX2, a control unit CU, two multipliers m1 and m2, and two adders a and a' and then uses the interpolation method for image correction. When the corresponding conversion value of the original image data point Or is not stored in the memory unit M', the graphic processor 30 uses the two conversion values that are nearest to the original image data point Or in the interpolation operation to calculate the corrected image parameter value of the original image data point Or. As shown in FIG. 3B, if the two conversion values of the nodes A and B are already stored in the memory unit M' and the value of the original image data point Or is between the corresponding input image value of the nodes A and B, the corrected image parameter value Y of the original image data point Or is thus calculated.

Since the original image data point Or is represented by N=10 bits and the memory unit M' has only 64 (that is $2^6$) units of the memory space, the four least significant bits (LSBs) determine how to utilize the nodes A and B for interpolation. When the control unit CU receives the image parameter value to be calculated, it accompanies with the memory unit M' and the multiplexers MUX1 and MUX 2 to find the two nodes A and B that are nearest to the image parameter value and to determine the value of the LSBs of the image parameter value. Finally, it calculates the corrected image parameter value of the original image data point Or by interpolating from the nodes A and B. The equation for the above interpolation operation is given by:

$$Y = A + (B - A)\frac{LSBs}{16} \qquad (1)$$

However, after the graphic processor 30 carries out the correction, since most of the corrected image parameter values are calculated from interpolation, the corrected image curve RV has too many obvious turning points, such as A', B', C', D', . . . , shown in FIG. 3C. These turning points cause intense image brightness variation and undesired creases appeared in the displayed picture.

BRIEF SUMMARY OF THE INVENTION

Therefore, one object of the invention is to provide a gamma image correction method to generate an almost linear smooth curve without increasing the cost of the memory unit.

According to one embodiment of the invention, a gamma image correction method using an improved interpolation operation is provided. For one original image data point, the gamma image correction method uses more than two (such as three) conversion values to generate the corrected image parameter value of the original image data point.

According to another embodiment of the invention, a gamma image correction method using an improved interpolation operation is provided. The gamma image correction method generates the corrected image parameter value of an original image data point by using the $2^k$ conversion values stored in the memory unit. The original image data point is represented by N bits and N is larger than k. The gamma image correction method comprises the following steps. At first, an original image data point is received and the original image data point corresponds to a first, a second, and a third conversion values. Next, a first reference point is retrieved from the line connecting the first conversion value and the second conversion value and an arbitrary second reference point is retrieved from the line connecting the second conversion value and the third conversion value. Then, the first reference point and the second reference point are used to generate the image parameter value of the original image data point after gamma image correction.

According to one embodiment of the invention, a gamma image correction device using an improved interpolation operation is provided. For one original image data point, the gamma image correction method uses more than two (such as three) conversion values to generate the corrected image parameter value of the original image data point. The image correction device comprises a memory unit for storing $2^k$ conversion values, p multiplexers, p multipliers, a control unit, and an adder. The original image data point is represented by N bits and N is larger than k. The control unit controls p multiplexers and p multipliers where p is larger than 2 and retrieves p conversion values according to the original image data point to perform arithmetical operation by p multiplexers and p multipliers. According to the output value of the p multipliers, the adder generates the image parameter value of the original image data point after gamma image correction.

According to another embodiment of the invention, a gamma image correction device using an improved interpolation operation is provided. For one original image data point, the gamma image correction method uses more than two (such as three) conversion values to generate the corrected image parameter value of the original image data point. The image correction device comprises a memory unit for storing $2^k$ conversion values, a retrieving device, a control unit, and an output device. The retrieving device sequentially retrieves p conversion values from the memory unit and performs arithmetical operations to sequentially generate p output values. The control unit sequentially retrieves p conversion values from the memory unit according to the original image data point to perform arithmetical operations. The output device generates the image parameter value according to the p output values. The original image data point is represented by N bits. The memory unit stores $2^k$ conversion values. N is larger than k.

The gamma image correction method of the invention uses more than two conversion values to calculate the corrected image curve by using interpolation operations without increasing the cost of the memory unit so as to redistribute the turning points and provide a smooth image curve.

DETAILED DESCRIPTION OF THE INVENTION

Figure 1:
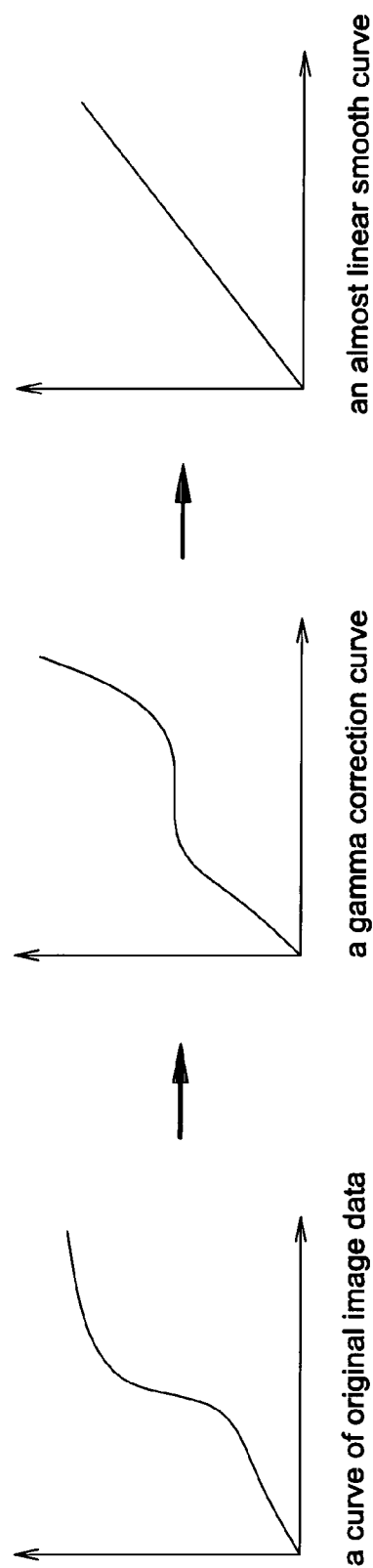
FIG. 1 shows a schematic diagram illustrating a gamma image correction method in the prior art.
Figures 2A, 2B:
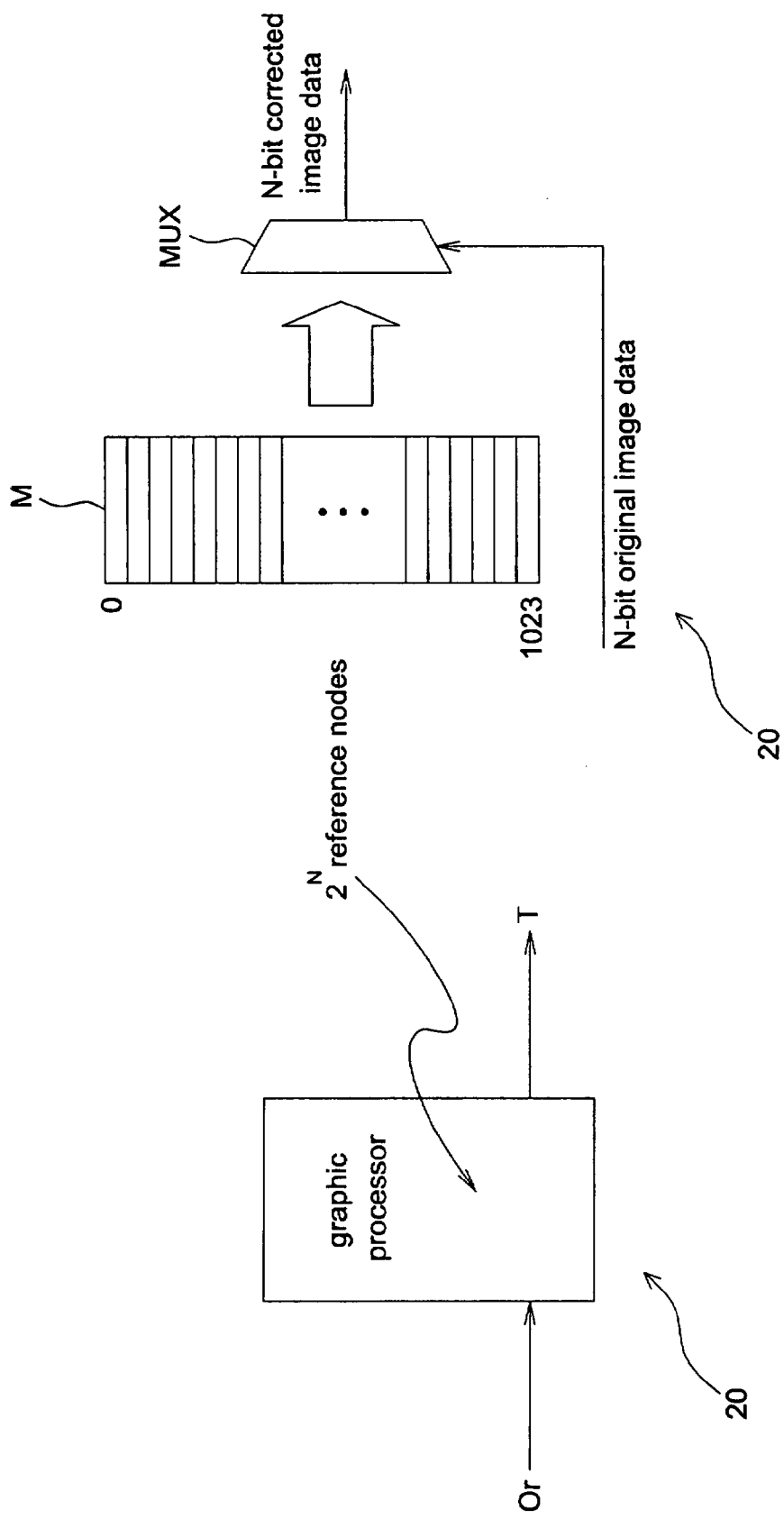
FIGS. 2A and 2B show schematic diagrams illustrating graphic processors in the prior art.
Figure 3A:
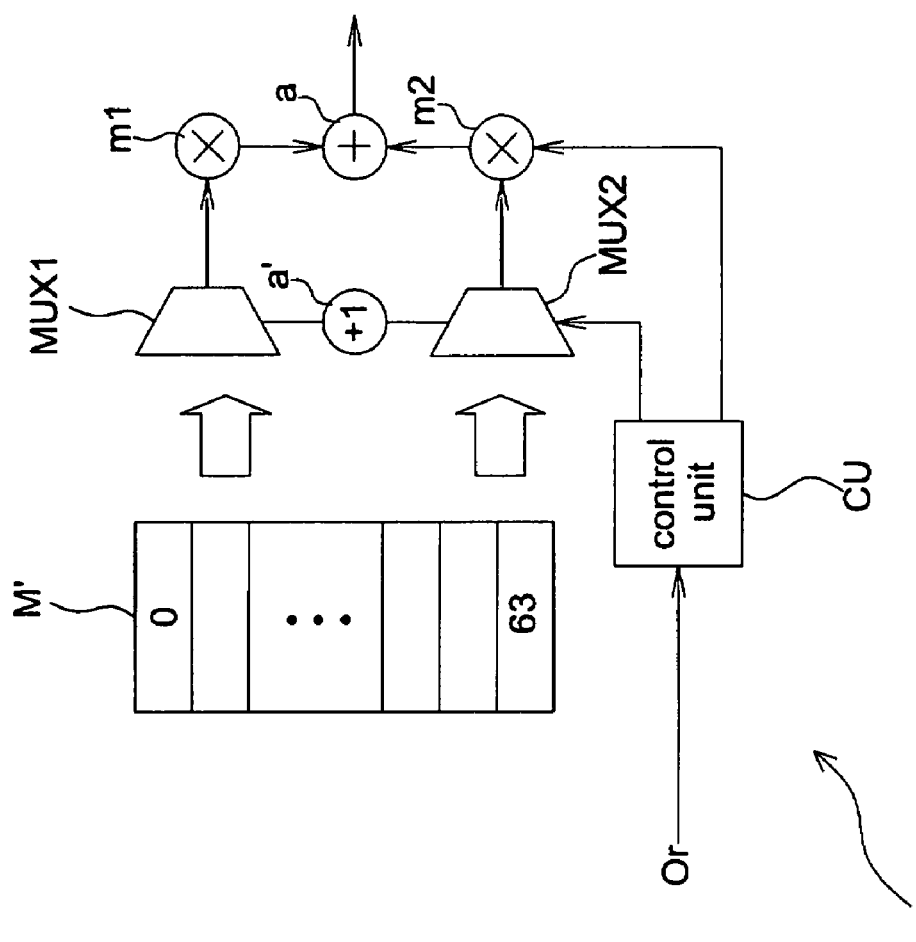
FIG. 3A shows a schematic diagram illustrating a graphic processor in the prior art.
Figure 3B:
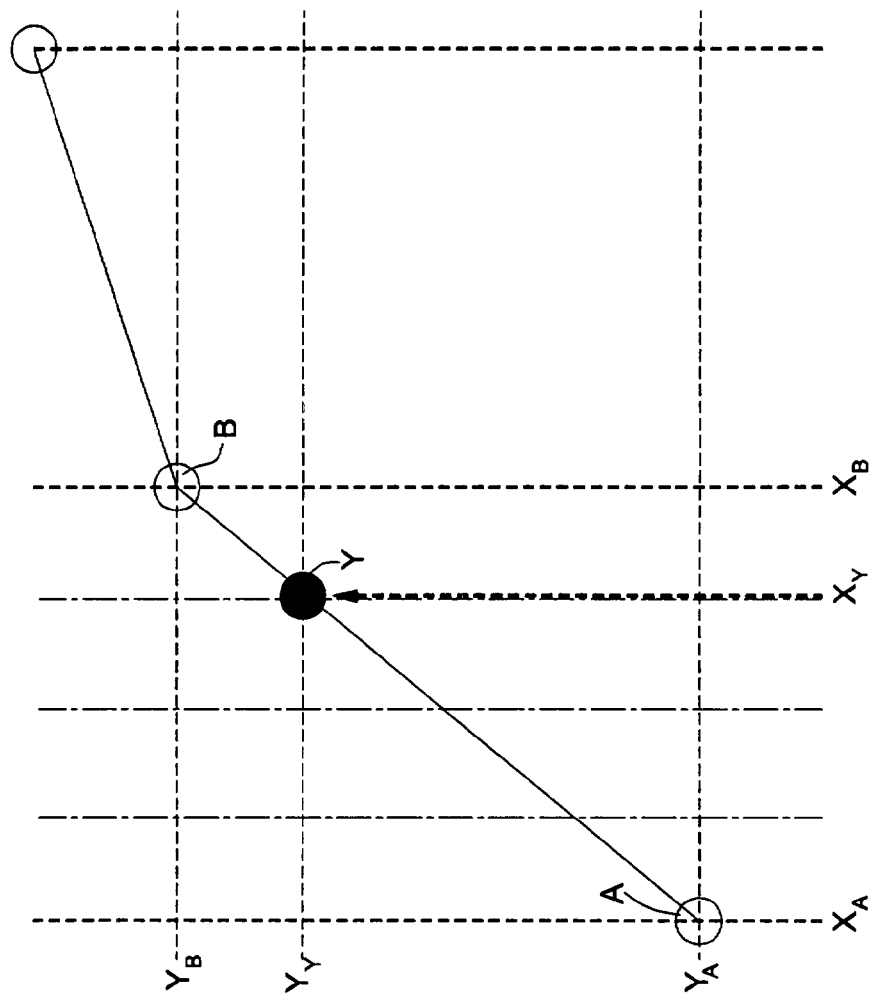
FIGS. 3B and 3C show the operation curves of the graphic processor shown in FIG. 3A in the prior art.
Figure 3C:
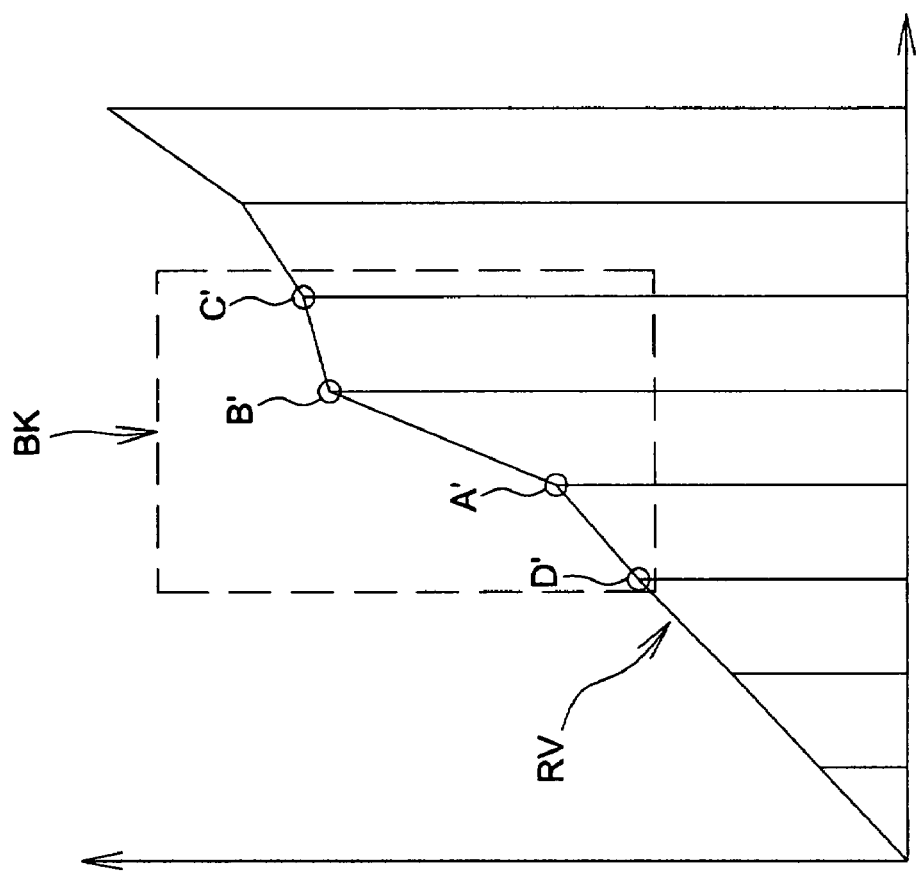
Figure 4A:
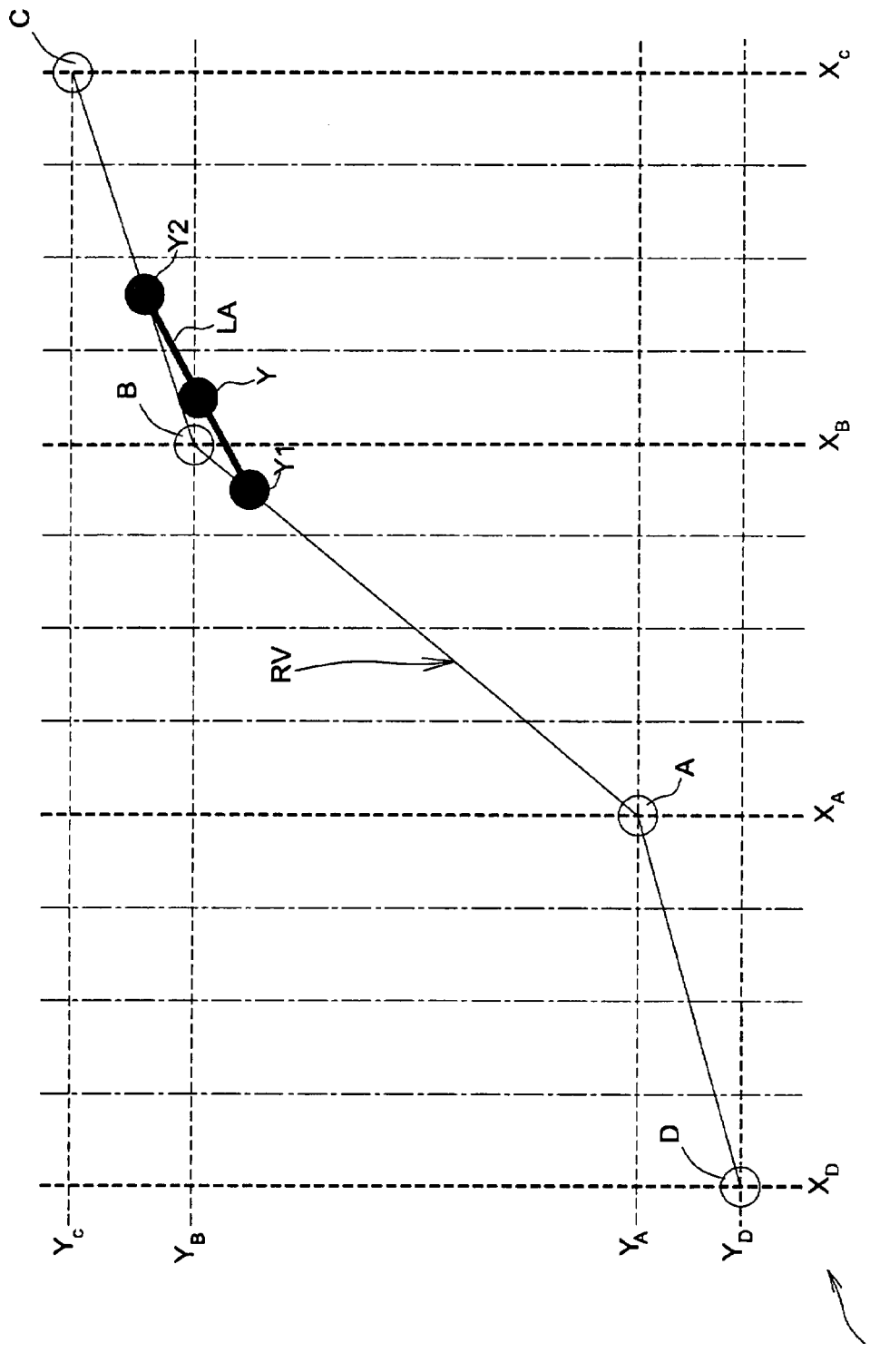
FIGS. 4A and 4B show schematic diagrams illustrating a gamma image correction method according to one embodiment of the invention.
Figure 4B:
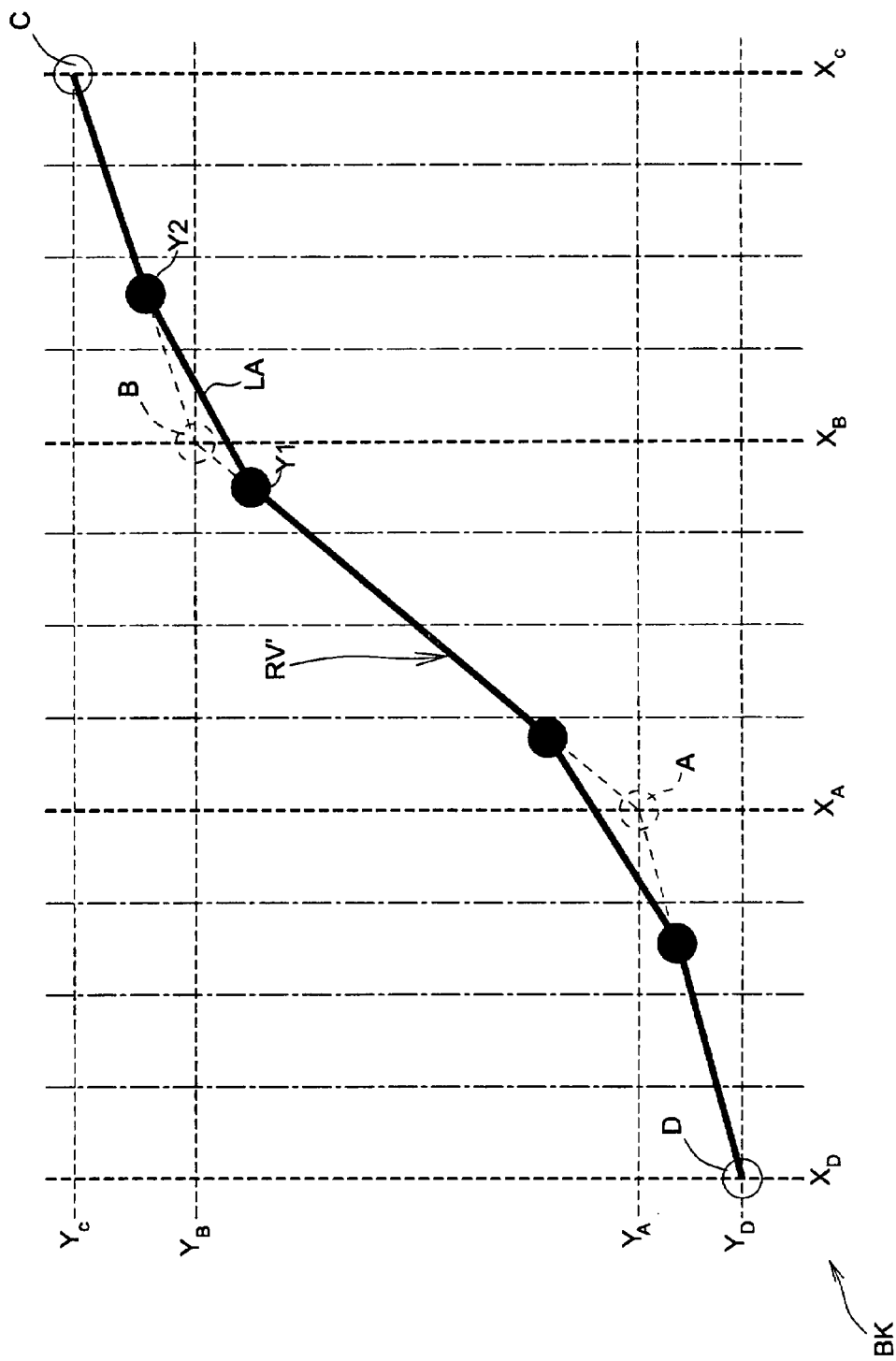

FIGS. 4A and 4B show the schematic diagrams illustrating a first embodiment of the gamma image correction method of the invention. FIG. 4A shows the enlarged diagram of the image curve RV in the block BK shown in FIG. 3C. Those who are skilled in the art should understand that the image curve RV is comprised of a plurality of original image data points Or. The gamma image correction method provides an improved interpolation operation by using more than two (such as three) conversion values to generate the corrected image parameter value Y of the original image data point Or.

For example, three conversion values are used in the interpolation operation. It is assumed that a memory unit stores three conversion values (nodes A, B, and C shown in FIG. 4A) corresponding to three turning points A', B', and C'. The parameter value of the original image data point Or is between the parameter values corresponding to the nodes A and B or the nodes B and C or the nodes C and A. The corrected image parameter value Y of the original image data point Or is to be calculated.

At first, the graphic processor receives the image data point Or. Then, the adjacent nodes A, B, and C are retrieved from the memory unit. The graphic processor calculates a first slope through the nodes A and B and a second slope through the node B and the adjacent node C. Then, an arbitrary first reference point Y1 having the first slope between the nodes A and B is retrieved and an arbitrary second reference point Y2 having the second slope between the nodes B and C is retrieved. Finally, the first reference point Y1 and the second reference point Y2 is used to calculate a correction slope. The image parameter value Y of the line connecting the two reference points based on the correction slope is calculated. As another corrected image parameter values Y' of the other image data points Or' on the connecting line is calculated according to the correction slope, the existed turning point B' can be redistributed and a smoother line segment LA is obtained in the whole image curve RV.

Similarly, other turning points, such as the turning point A', in the image curve RV can be redistributed by the same gamma image correction method. Hence, a smoother corrected image curve RV', shown in FIG. 4B, is obtained and the problem of having obvious turning points in the prior art is resolved.

Of course, by repeatedly applying the gamma image correction method of the invention, all of the turning points can be eliminated so as to obtain a smooth curve.

Figure 5A:
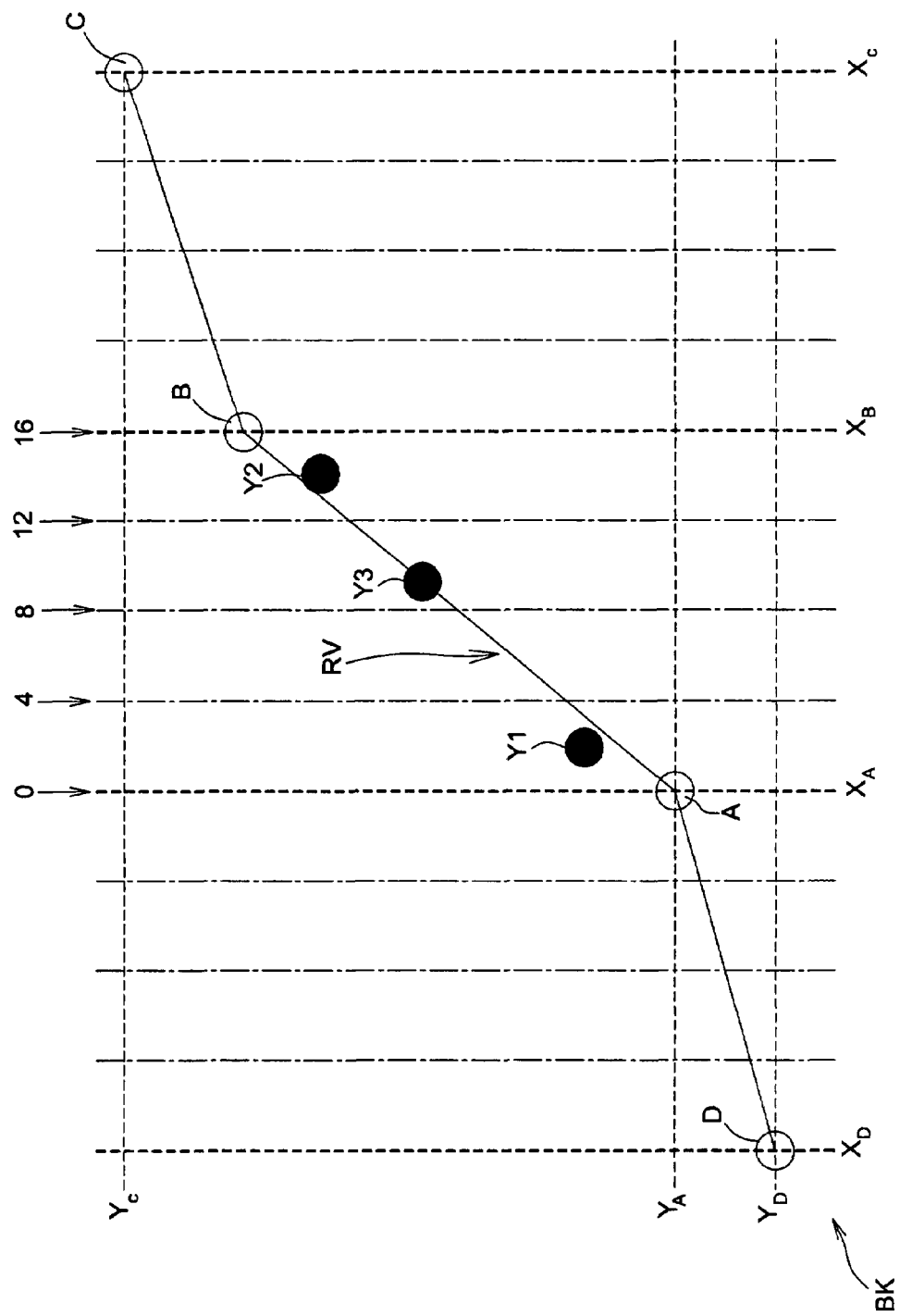
FIGS. 5A and 5B show schematic diagrams illustrating a gamma image correction method according to another embodiment of the invention.

A second embodiment of the gamma image correction method of the invention is shown in FIG. 5A. The concept of this method is similar to that in the first embodiment. For one original image data point Or, both methods use more than two (such as three) conversion values to generate the corrected image parameter value Y of the original image data point Or.

The gamma image correction method is processed as the following. At first, the graphic processor receives one original image data point Or represented by N bits. Then, p (p>2) conversion values are retrieved from a memory unit according to the original data point Or. It should be noted that the memory unit stores $2^k$ conversion values, N is larger than K, and the memory unit stores the $2^k$ conversion values according to a predetermined sequence. The first conversion value, the second conversion value, and the third conversion value are three successive conversion values stored in the memory unit. The parameter value Y of the original image data point Or after gamma image correction is generated by performing arithmetical operations on the p conversion values.

One example of the arithmetical operation to generate the corrected image parameter value is described in the following:

Referring to FIG. 5A, it is assumed that the N−K=4, the above p=3 (that is, three conversion values are used for the interpolation operation) and the memory unit stores four conversion values (nodes) D, A, B, and C, corresponding to the turning points D', A', B', and C'. When the corrected image parameter value Y1 of the original image data point Or is between the conversion values A and B, the value of the 4 least significant bits of the original image data is LSBs, and 0<=LSBs<4, then the arithmetical operation is given by:

$$Y1 = \frac{3}{4}A + \frac{1}{4}D + \frac{1}{4}(B-D)\frac{(LSBs+(4))}{2\times(4)} \quad (2)$$

in which Y1 is the image parameter value of the original image data point Or after gamma image correction, A is the second conversion value, B is the third conversion value, D is the first conversion value.

When the corrected image parameter value Y2 of the original image data point Or is between the conversion values A and B, the value of the 4 least significant bits of the original image data is LSBs, and $(2^{(4)}-(4))$<=LSBs<$2^{(4)}$, the arithmetical operation is as follows:

$$Y2 = \frac{3}{4}B + \frac{1}{4}A + \frac{1}{4}(C-A)\frac{(LSBs-(2^{(4)}-(4)))}{2\times(4)} \quad (3)$$

in which Y2 is the image parameter value of the original image data point Or after gamma image correction, A is the second conversion value, B is the third conversion value, C is the first conversion value Furthermore, when the corrected image parameter value Y3 of the original image data point Or is between the conversion values A and B, the value of the 4 least significant bits of the original image data Or is LSBs, and (4)<=LSBs<$(2^{(4)}-(4))$, the arithmetical operation is as follows:

$$Y3 = A + (B-A)\frac{LSBs}{2^{(4)}} \quad (4)$$

in which Y3 is the image parameter value of the original image data point Or after gamma image correction, A is the second conversion value, B is the third conversion Value The gamma image correction method of the embodiment uses any three conversion values of the four conversion values D, A, B, and C to perform the interpolation operation to generate the corrected image parameter Y of the original data point Or. After generating the corrected parameter value Y corresponding to each image data point Or in the image curve RV, a smoother corrected image curve RV' by the gamma image correction method of the embodiment, shown as a bold line segment in FIG. 5, is obtained and thus the problem of having obvious turning points is resolved. Thus, by applying the gamma image correction method of the embodiment repeatedly, all of the turning points of the image curve can be redistributed and a smooth curve is generated.

Figure 6:
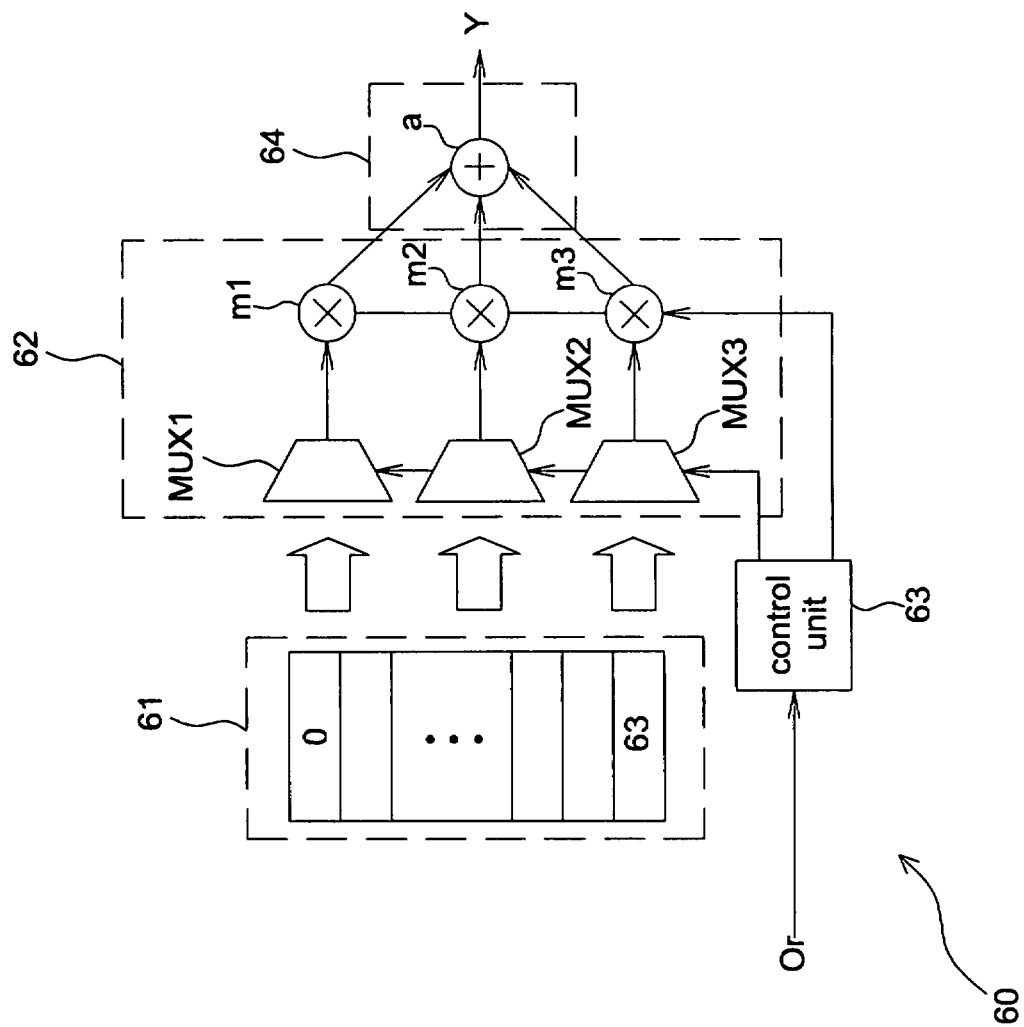
FIG. 6 shows a schematic diagram illustrating a gamma image correction device according to one embodiment of the invention.

FIG. 6 shows a device for performing the gamma image correction method illustrated in FIG. 5A. The gamma image correction device 60 comprises a memory unit 61, a retrieving device 62, a control unit 63, and an output device 64. The memory unit 61 stores $2^k$ (k is a positive integer). The retrieving device 62 comprises p multiplexers and p multipliers and uses the p multiplexers and the p multipliers to retrieve p (p is a positive integer, p>2) conversion values from the memory unit 61 to perform arithmetical operations. The control unit 63 receives an original image data point Or and controls the retrieving device 62 to retrieve the p values from the memory unit 61 to perform the arithmetical operations according to parameter of the original image data point Or. According to the output value of the retrieving device 62, the output device 64 generates the corrected image parameter value Y. It should be noted that the original image data point Or is represented by N bits, N is a positive integer, and N>k.

As shown in FIG. 6, one example of the invention assumes that k=6, N=10 (that is, N−k=4), and p equals to 3. That is, the gamma image correction device 60 uses the three conversion values to perform the interpolation operation to generate the corrected image parameter value Y. Therefore, the memory unit 61 stores a total of 64 conversion values. The retrieving device 62 comprises three multiplexers MUX1, MUX2, and MUX3 and three multipliers m1, m2, and m3. The output device 64 is implemented by an adder.

Figure 5B:
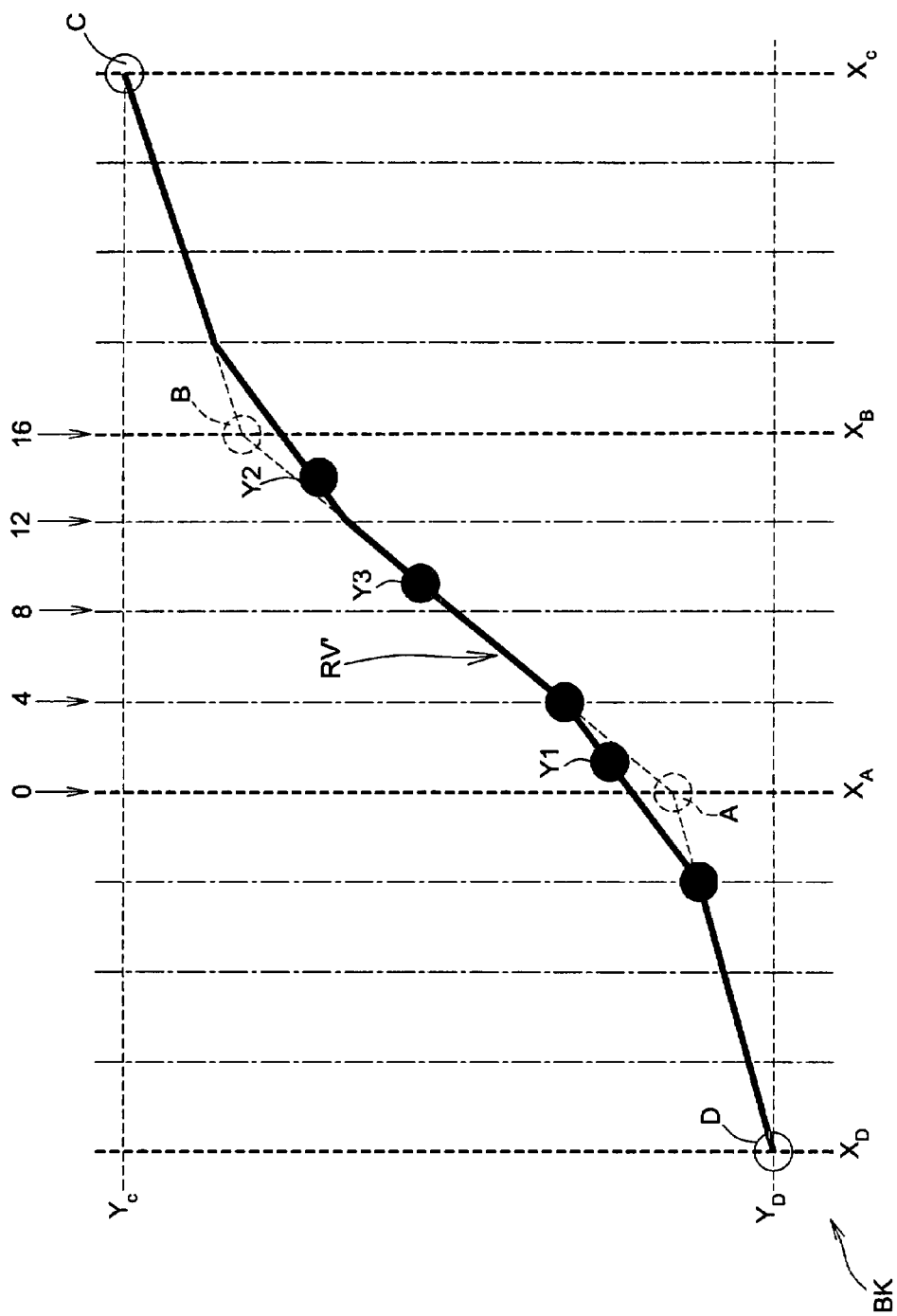

Referring to FIGS. 5A, 5B, and 6 at the same time, when the gamma image correction device 60 is in operation, the control unit 63 receives original image data point Or and, according to the parameter value of the original image data point Or, controls the three multiplexers MUX1, MUX2, and MUX3 to retrieve a first conversion value, a second conversion value, and a third conversion value, respectively. According to the parameter value of the original image data point Or, the control unit 63 also controls the three multipliers m1, m2, and m3 to perform multiplying operations on the first conversion value, the second conversion value, and the third conversion value, respectively. The first conversion value, the second conversion value, and the third conversion value processed by the three multipliers m1, m2, and m3 are carried out arithmetical operations by the adder a of the output device 64 so as to generate the corrected image parameter value Y.

When the corrected image parameter value Y1 of the original image data point Or is between the conversion value A and the conversion value B, the value of the least significant bits of the original image data point Or is LSBs, and 0<=LSBs<4, the image parameter value Y1 generated by the adder a is given by:

$$Y1 = \frac{3}{4}A + \frac{1}{4}D + \frac{1}{4}(B-D)\frac{(LSBs+4)}{8} \quad (5)$$

in which Y1 is the corrected image parameter value of the original image data point Or, A is the second conversion value, B is the third conversion value, D is the first conversion value.

When the corrected image parameter value Y2 of the original image data point Or is between the conversion value A and the conversion value B, the value of the least significant bits of the original image data point Or is LSBs, and 12<=LSBs<16, the image parameter value Y2 generated by the adder a is given by:

$$Y2 = \frac{3}{4}B + \frac{1}{4}A + \frac{1}{4}(C-A)\frac{(LSBs-12)}{8} \quad (6)$$

in which Y2 is the corrected image parameter value of the original image data point Or, A is the second conversion value, B is the third conversion value, C is the first conversion value.

Furthermore, when the corrected image parameter value Y3 of the original image data point Or is between the conversion value A and the conversion value B, the value of the least significant bits of the original image data point Or is LSBs, and 4<=LSBs<12, the image parameter value Y3 generated by the adder is given by:

$$Y3 = A + (B-A)\frac{LSBs}{16} \quad (7)$$

in which Y3 is the corrected image parameter value of the original image data point Or, A is the second conversion value, B is the third conversion value.

The gamma image correction device 60 of the invention uses a memory unit with the memory space less than the bits of the original image data point Or to store the conversion values of the parameter of the corresponding original image data point Or. For example, when the original image input data is represented by 10 bits (that is, 1024 units of the memory space is required by the prior art), the gamma image correction device 60 uses only 64 ($2^6$) units of the memory space. In addition, the gamma image correction device 60 uses more than two conversion values to smooth the turning points in the image curve to enhance the image quality and resolve the problem in the prior art without increasing the cost of the memory unit.

It should be noted that there are various retrieving methods for the retrieving device 62 controlled by the control unit 63 to retrieve the p conversion values from the memory unit 61. For example, they can be retrieved sequentially or according to the requirement and setting of the user.

Figure 7:
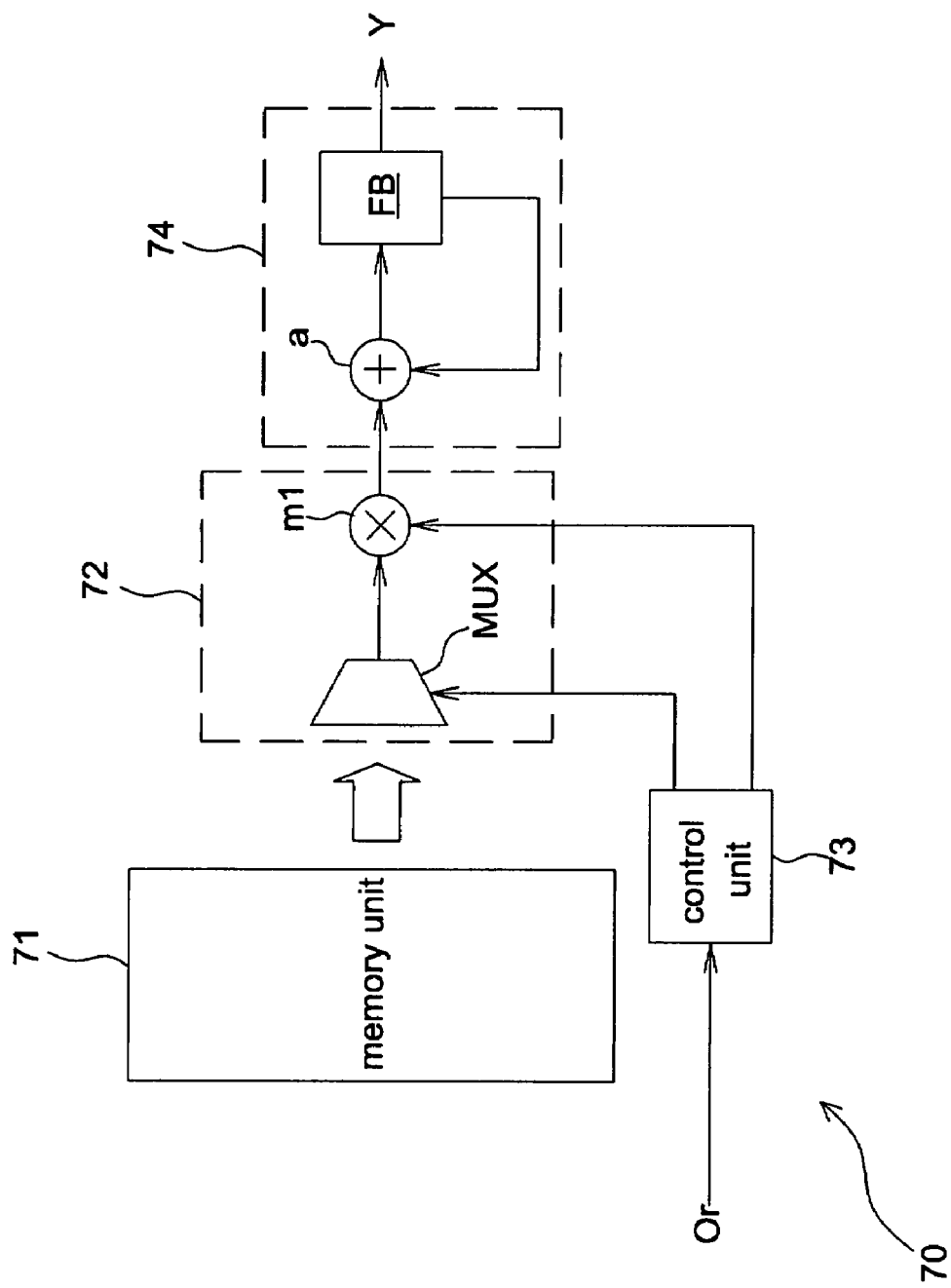
FIG. 7 shows a schematic diagram illustrating a gamma image correction device according to another embodiment of the invention.

Furthermore, in order to decrease the cost of the gamma image correction device 60 shown in FIG. 6, another embodiment of the invention provides a gamma image correction device 70, shown in FIG. 7. The gamma image correction device 70 is the device to implement the gamma image correction method illustrated in FIG. 5A to generate an image parameter value Y processed by the gamma image correction from the original image data point Or. The gamma image correction device 70 comprises a memory unit 71, a retrieving device 72, a control unit 73, and an output device 74.

The setting and the operation of the gamma image correction device 70 is similar to that of the gamma image correction device 60. The difference is that: the retrieving device 72 of the gamma image correction device 70 comprises only a multiplexer MUX and a multiplier m1 and the output device 74 further comprises a feedback output device FB. According to the parameter value of the original image data point Or, the control unit 73 controls the multiplexer MUX to retrieve p (p is an positive integer and p is larger than 2) conversion values sequentially from the memory unit 71. The control unit 73 also controls the multiplier m1 to perform multiplying operations on the p conversion values sequentially and individually to generate p output values sequentially. Then, the adder of the output device 74 sequentially receives the p output values to perform addition operation. The feedback output device FB sequentially generates a feedback value to the adder to operate on data individually to generate a temporary parameter value sequentially. The feedback device FB sequentially receives these temporary parameter values to generate the corrected image parameter value Y. From the above descriptions, the gamma image correction device 70 spares two multiplexers and two multipliers shown in FIG. 6. While operating in multiplying frequency mode, the device 70 completes the arithmetical operations, such as the equations (5), (6), and (7), to generate the corrected image parameter value Y.

In conclusion, the gamma image correction method and the device according to the invention use two or more conversion values to perform the interpolation operation to generate the corrected image parameter value Y of the original image data point Or. Besides, the image curve turning points are smoothed and the problems in the prior art are resolved. Furthermore, the above mentioned image parameter can be one of the followings: gray scale, contrast, brightness, chromaticity, saturation, acuity, color temperature, and white balance or any combination of the above.

Although the embodiments according to the invention are described in the above, these do not limit the scope of the invention. Various modifications and changes can be made by those who are skilled in the art without deviating from the essence of the invention.

What is claimed is:

1. A gamma image correction method, comprising:
   receiving an original image data point;
   retrieving p conversion values (p is larger than 2) from a memory unit according to the original image data point; and
   performing arithmetical operations for the p conversion values to generate an image parameter value from the original image data point after gamma image correction wherein the original image data point is represented by N bits, the memory unit contains $2^k$ conversion values, and N is larger than k;
   wherein p, N, and k are positive integers and the image parameter value is used for display;
   wherein p equals to 3 and the three conversion values comprise a first conversion value, a second conversion value, and a third conversion value; and
   wherein the memory unit stores the $2^k$ conversion values in a predetermined sequence and the first conversion value, the second conversion value, and the third conversion value are three conversion values successively stored in the memory unit.

2. The gamma image correction method according to claim 1, wherein the image parameter value is selected from the group consisting of the following: gray scale, contrast, brightness, chromaticity, saturation, acuity, color temperature, and white balance or any combination of the above.

3. A gamma image correction device for generating an image parameter value from an original image data point after gamma image correction, comprising:
   a memory unit for storing $2^k$ conversion values;
   a retrieving device retrieving p conversion values from the memory unit to perform arithmetical operations wherein p is larger than 2;
   a control unit for controlling the retrieving device to retrieve the p conversion values to perform the arithmetical operations according to the original image data point; and
   an output device for generating the image parameter value according to the output value of the retrieving device;

wherein the original image data point is represented by N bits, the memory unit contains $2^k$ conversion values, and N is larger than k;

wherein p, N, and k are positive integers; and wherein the retrieving device comprises p multiplexers and p multipliers to retrieve the p conversion values for performing the arithmetical operations.

4. The gamma image correction device according to claim 3, wherein p equals to 3 and the control unit controls the three multiplexers to retrieve a first conversion value, a second conversion value, and a third conversion value, respectively, and also controls the three multipliers to perform multiplying operations on the first conversion value, the second conversion value, and the third conversion value, respectively.

5. The gamma image correction device according to claim 4, wherein the output device comprises an adder that performs arithmetical operations on the first conversion value, the second conversion value and the third conversion value after processed by the three multipliers to generate the image parameter value.

6. A gamma image correction device for generating an image parameter value from an original image data point after gamma image correction, comprising:

a memory unit for storing $2^k$ conversion values;

an retrieving device to sequentially retrieve p conversion values from the memory unit for performing arithmetical operations and generating p output values sequentially;

a control unit for controlling the retrieving device to sequentially retrieve the p conversion values from the memory unit for the arithmetical operations according to the original image data point; and an output device for generating the image parameter value according to the output values of the retrieving device wherein p is larger than 2;

wherein the original image data point is represented by N bits, the memory unit contains $2^k$ conversion values, and N is lager than k;

wherein p, N, and k are positive integers; and wherein the retrieving device comprises a multiplexer and a multiplier and the control unit controls not only the multiplexer to sequentially retrieve the p conversion values but also the multiplier to sequentially perform multiplying operations on the p conversion values, individually, so as to generate the p output values sequentially.

7. The gamma image correction device according to claim 6, wherein the output device comprises an adder and a feedback output device in which the adder receives the p output values together with a feedback value sequentially provided by the feedback output device to generate a temporary parameter value and the feedback output device sequentially receives the temporary parameter value to generate the image parameter value.

* * * * *